United States Patent [19]

Ahern

[11] Patent Number: 5,137,241
[45] Date of Patent: Aug. 11, 1992

[54] BURNER MOUNTING

[75] Inventor: Michael D. Ahern, Fond du Lac, Wis.

[73] Assignee: Harbridge, Inc., Fond du Lac, Wis.

[21] Appl. No.: 723,041

[22] Filed: Jun. 28, 1991

[51] Int. Cl.⁵ .............................................. A47H 1/10
[52] U.S. Cl. ................................... 248/298; 248/274;
248/323; 248/327
[58] Field of Search ............... 248/323, 320, 327, 901,
248/544, 298, 674, 675, 317, 274, 287, 295.1,
188.7

[56] References Cited

U.S. PATENT DOCUMENTS

| | | | |
|---|---|---|---|
| 1,332,840 | 3/1920 | Jackson | 248/675 |
| 2,751,178 | 6/1956 | Knecht | 248/317 |
| 3,953,015 | 4/1976 | Taylor et al. | 248/317 X |
| 3,998,419 | 12/1976 | Semmerling | 248/323 |
| 4,630,423 | 12/1986 | Lind | 248/317 X |
| 4,789,122 | 12/1988 | Gutsgell | 248/188.7 |
| 4,846,431 | 7/1989 | Pflieger | 248/317 X |
| 5,014,381 | 5/1991 | Eddy | 248/544 X |

Primary Examiner—Carl D. Friedman
Assistant Examiner—Derek J. Berger
Attorney, Agent, or Firm—Donald Cayen

[57] ABSTRACT

A burner mounting enables a longitudinally extending burner to be removably suspended from a framework without requiring the use of any tools or the manipulation of any fasteners associated with the mounting. The burner mounting comprises an angle fastened to each end of the burner and having one horizontal leg. The upper leg of a channel is secured to the framework above each burner angle. Shims or other adjustment means are interposed between the channel upper leg and the framework to locate a channel lower leg at a selected vertical location. The horizontal legs of the angles rest on the lower legs of the respective channels. Pins in the angles engage slots in the channel lower legs. The slots accommodate thermal expansion of the burner while maintaining transverse positioning of the burner relative to the framework.

14 Claims, 2 Drawing Sheets

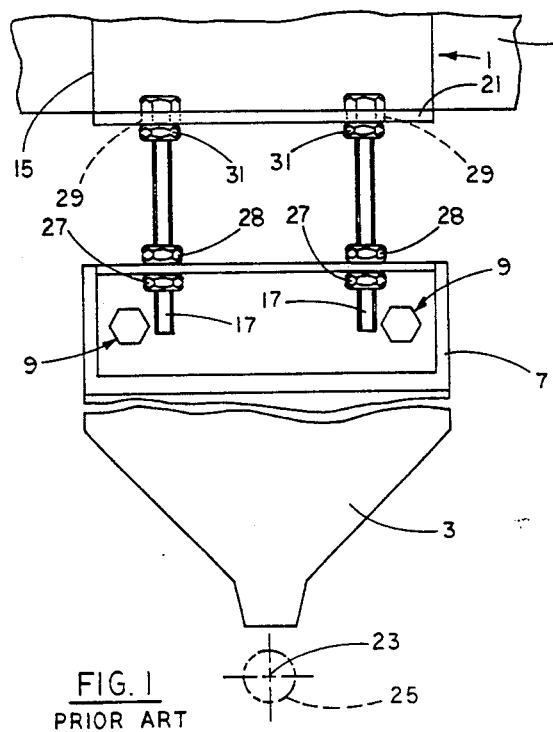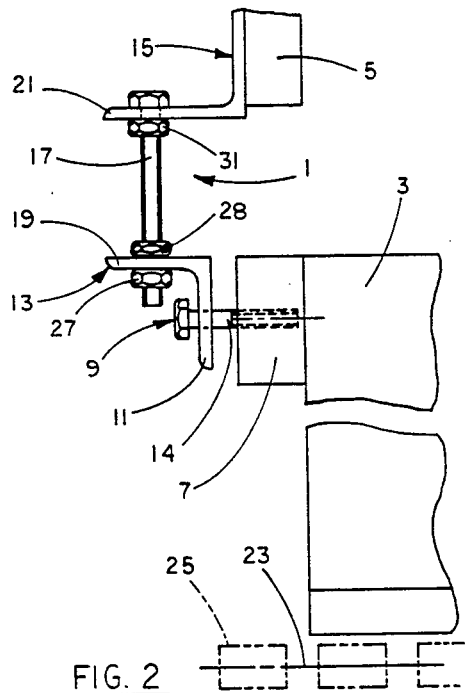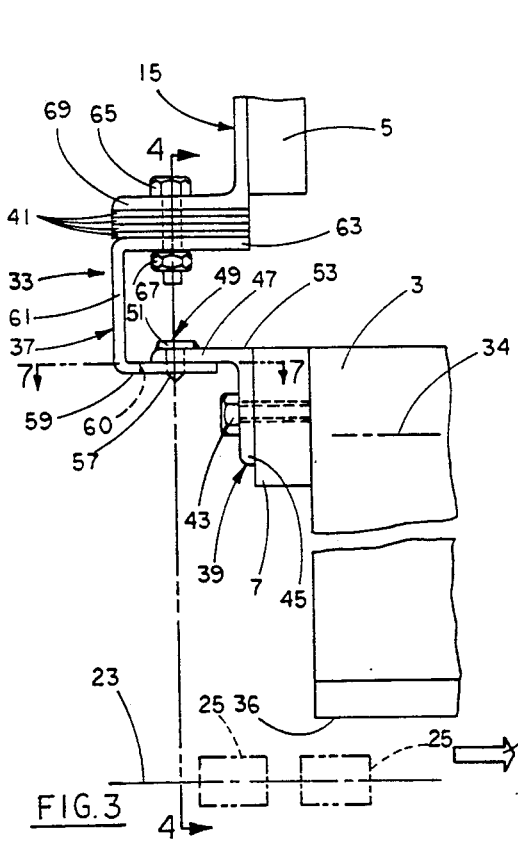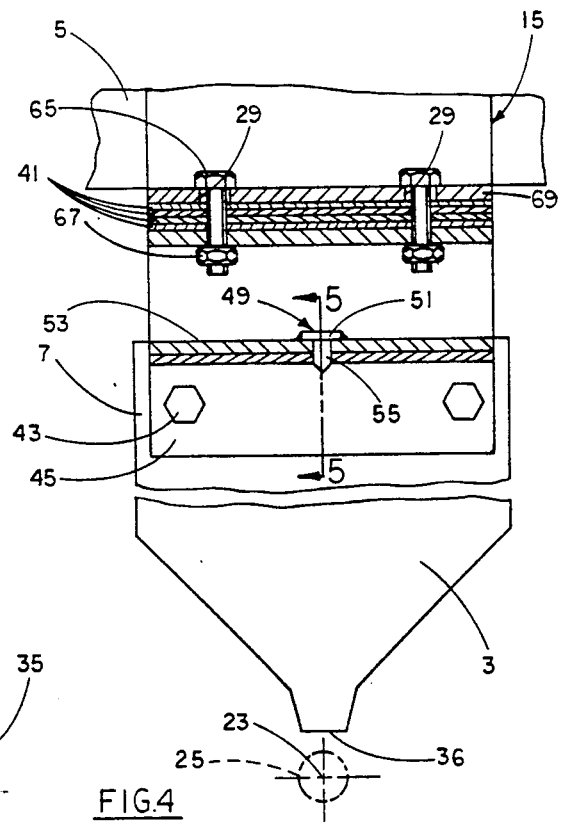

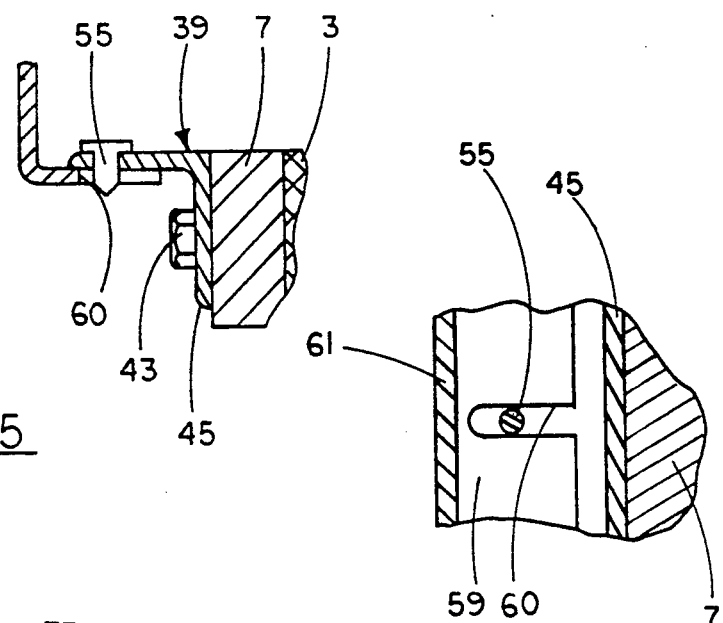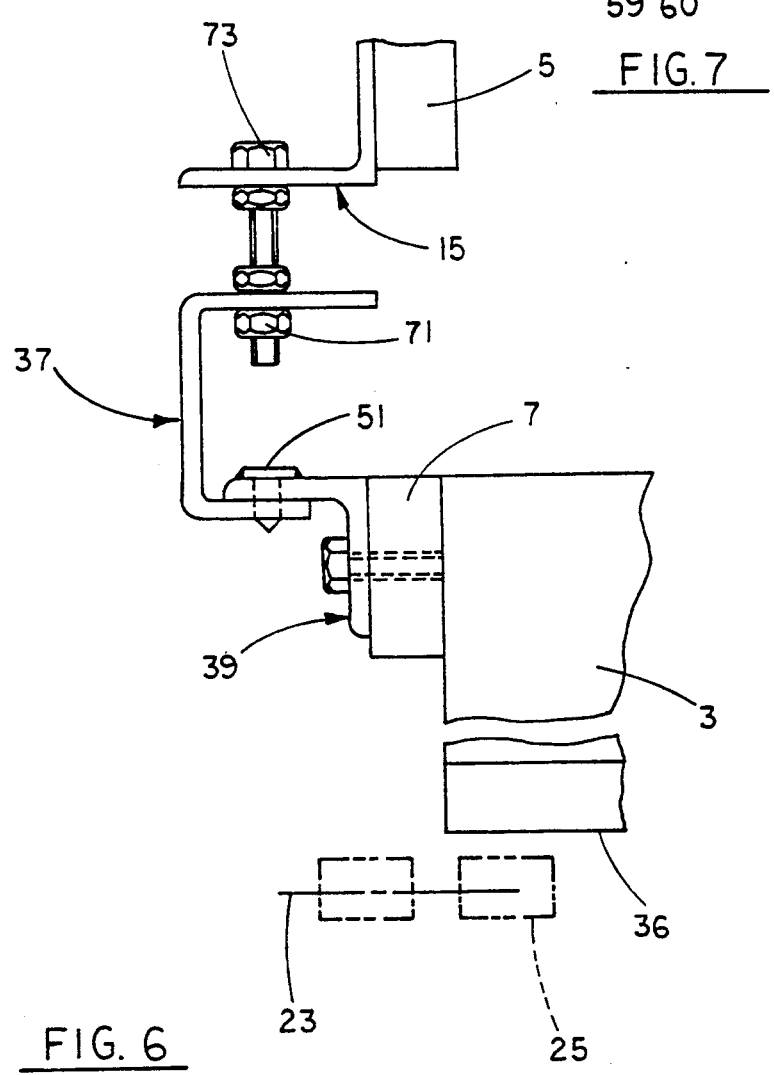

BURNER MOUNTING

BACKGROUND OF THE INVENTION

1. Field of the Invention

This invention pertains to support devices, and more particularly to apparatus for replaceably suspending a selected object from a fixed member.

2. Description of the Prior Art

During the manufacture of welded steel cans, it is necessary that the welded seams be heated. A common method of heating the can seams is to propel them sequentially along a horizontal path concentric with their longitudinal axes so as to pass under one or more elongated gas burners. The gas burners are installed in end to end relation, and they are normally suspended from an overhead framework. One well known burner is marketed under the trademark Flynn. The Flynn burners have a width of approximately four inches and a length of approximately five feet. The burners produce a soft flame along their bottom sides, and the can seams are proximate the flames as the cans are propelled along the length of the burners.

To properly heat the can seams, it is essential that the burner nozzles be very accurately located relative to the moving cans in both directions transverse to the axis of can movement. Further, the burner nozzles must be parallel to the axis of can movement.

After a period of operation, the gas burners require routine cleaning or other maintenance. Accordingly, it is common practice to periodically remove a burner from the framework, clean it, and reinstall it. It is very important that the burner be returned to its original correct location after cleaning.

To facilitate removal and accurate replacement of Flynn burners after cleaning, it is known to suspend the burners by means of adjustable components. FIGS. 1 and 2 show typical prior apparatus 1 for adjustably mounting a burner 3 to a fixed framework 5. The apparatus 1 is present on both longitudinal ends of the burner 3. The burner includes an end plate 7 on both ends thereof. A pair of long screws 9 are threaded into each plate 7. The screws 9 pass through associated holes in the vertical leg 11 of an angle 13. The framework 5 typically includes a second angle 15. The angle 13, screws 9, and burner 3 are suspended from the framework angle 15 by a second pair of screws 17. The screws 17 pass through horizontal legs 19 and 21 in the angles 13 and 15, respectively. Vertical adjustment of the burner relative to the framework and to the axis 23 of travel of the cans 25 is provided by double nuts 27 and 28 on each screw 17. Horizontal adjustment of the burner relative to the framework and transverse to the can axis 23 is achieved by means of slots 29 in the horizontal leg 21 of the angle 15. Nuts 31 lock the screws 17 in their proper horizontal location within the slots 29. At least a portion of the burner plate 7 normally underlies the framework angle 15. Thermal expansion of the burner is accommodated by the sliding of the shanks 14 of the screws 9 within the holes in the vertical leg 11 of the angle 13.

The burner mounting apparatus 1 has a number of disadvantages, which are aggravated by the mounting apparatus being invariably located in a relatively inaccessible region of the framework 5. To remove a burner 3 from the framework 5, it is necessary either to reach and loosen the screws 9 from the burner plate 7 or the nuts 27 from the screws 17. Because of the confined working area, it is sometimes necessary to remove both the screws 9 and the nuts 27. The nuts 28 are also frequently disturbed. The screws 9 are often seized due to the heat produced by the burner. In addition, it is necessary that the burner be supported by external means while a person removes the screws 9 or nuts 27. Tools, effort, and excessive time are thus required.

A related disadvantage of the prior mounting apparatus 1 pertains to the replacement of the burner 3 after servicing. Again, tools are required, and manipulating the tools and mounting components within the space available is awkward and difficult The proper alignment of an installed burner 3 is almost always destroyed when the burner is removed. It is thus necessary to realign the burner by additional manipulation of the various screws or nuts when it is replaced after servicing.

The result of the foregoing problems is that the prior mounting apparatus 1 is generally unsatisfactory.

SUMMARY OF THE INVENTION

In accordance with the present invention, a burner mounting is provided that enables an elongated burner to be rapidly removed from and quickly and accurately replaced on a supporting framework. This is accomplished by apparatus that requires no fasteners to install the burner on the framework or to maintain it at its proper location.

A burner mounting is used on both longitudinal ends of a burner. Each mounting includes an angle that is fastened to the end of the burner with one leg of the angle being horizontal. A pin is joined to and extends a short distance under the angle horizontal leg.

Each mounting further comprises a channel that has parallel first and second end legs joined to a middle leg. The second end leg of the channel has a slot with a width slightly greater than the diameter of the pin in the angle horizontal leg. The slot extends in the direction generally perpendicular to the plane of the middle leg.

At initial installation of the burner, the burner, with the angles fastened to both ends, is held in its desired location relative to the items it will heat with its flames. The channels are oriented generally perpendicular to the burner longitudinal axis with the top surfaces of the channel second end legs being in facing contact with the bottom surfaces of the burner angles and with the angle pins extending through the channel slots. Shims or the like are interposed between the channel first end leg and the framework such that the burner is located at its correct vertical location. Slots in the framework and in the first end legs of the channels enable the channels to be adjusted in the horizontal directions perpendicular to the burner longitudinal axis. Then the first end legs of the two channels are permanently secured to the framework to properly locate the burner in its vertical and horizontal position.

Once the channels are secured to the framework, they need not be moved again. The burner rests by gravity on the two channels by means of the two associated angles. The pin and slot combinations between the burner angles and channel second legs properly locate the burner in horizontal directions perpendicular to the burner longitudinal axis. The slot in the second leg of each channel enables the burner mounting to accommodate thermal expansion of the burner during use.

When burner cleaning becomes necessary, it is a very simple matter to lift the burner a short distance until the pins on the two angles are above the second legs of the two channels. Then the burner can be pulled horizontally transversely to the burner longitudinal axis and past the channels. The burner is then free for any required maintenance.

To replace the burner, it is necessary merely to align the burner between the two channels and push it transversely such that the pins on the two angles are over the corresponding slots in the two channels. Then the burner is lowered until the angles contact and are supported on the two channels, thereby returning the burner to its proper vertical location. The angle pins and channel slots cooperate to position the burner at its proper horizontal location in the burner transverse direction. In that manner, the burner is very quickly and easily removed from service and quickly and accurately returned to service without the use of any tools.

It is a feature of the present invention that it lends itself to retrofitting existing burner installations. The simplicity and low cost of the burner mounting make it very attractive to replace prior burner mountings.

Other advantages, benefits, and features of the present invention will become apparent to those skilled in the art upon reading the detailed description of the invention.

BRIEF DESCRIPTION OF THE DRAWINGS

FIG. 1 is an end view of a prior apparatus for suspending a burner from a framework.

FIG. 2, is a partial side view of FIG. 1.

FIG. 3 is a side view of the burner mounting of the present invention.

FIG. 4 is a cross sectional view taken along lines 4—4 of FIG. 3.

FIG. 5 is a cross sectional view taken along lines 5—5 of FIG. 4.

FIG. 6 is a side view of an alternate embodiment of the present invention.

FIG. 7 is a cross sectional view taken along lines 7—7 of FIG. 3.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structures. The scope of the invention is defined in the claims appended hereto.

Referring to FIGS. 3, 4, 5, and 7, a burner mounting 33 is illustrated that includes the present invention. The burner mounting 33 is particularly useful when used in pairs to removably suspend the opposite ends of an elongated burner 3 from a fixed framework 5. However, it will be understood that the invention is not limited to heat related applications.

In the particular installation shown, an angle 15 is a permanent part of the framework 5 at each end of the burner 3. A gas fired burner 3 having a horizontal longitudinal axis 34, such as is marketed under the trademark Flynn, is suspended from the framework by means of the angles 15. A plate 7 is permanently fastened to each end of the burner. The Flynn burner may be used to heat the seams of welded steel cans 25 that pass parallel to the burner axis 34 in the direction of arrow 35 under flames produced on the underside 36 of the burner, as is known in the art.

In the preferred embodiment, the burner mounting 33 at each end of the burner 3 comprises a channel 37, an angle 39, and one or more shims 41. The angle 39 is permanently fastened to the burner plate 7 by screws 43 passing through a vertical first leg 45 of the angle. The horizontal second leg 47 of the angle 39 is provided with a pin 49. The pin 49 may include a head 51 that is welded to the upper surface 53 of the angle horizontal leg 47. The pin shank 55 extends through the angle leg 47 and preferably terminates in a cone 57.

The channel 37 has a horizontal lower leg 59, a vertical middle leg 61, and a horizontal upper leg 63. The channel lower leg 59 is formed with a slot 60 that extends in the direction perpendicular to the middle leg 61. The slot 60 has a width that is slightly greater than the diameter of the pin shank 55.

The channel lower leg 59 is positioned in the vertical direction such that the burner 3 is in its correct vertical location when the horizontal leg 47 of the angle 39 rests on the channel lower leg and the pin shank 55 passes through the channel slot 60. To obtain that correct vertical location of the burner, the proper number of shims 41 are interposed between the framework angle 15 and the channel upper leg 63. The channel is secured to the framework 5 by screws 65 and nuts 67. The screws 65 pass through slots 29 in the framework angle 15 and through slotted holes in the channel upper leg 63.

To obtain the correct burner location in the horizontal directions transverse to the burner axis 34, the screws 65 are moved within the framework angle slots 29. When the burner 3 is in its proper location vertically and transversely relative to the can axis 23, the nuts 67 are permanently tightened.

An important aspect of the present invention is that the upper leg 63 and the lower leg 59 of the channel 37 have unequal widths. To provide full bearing for the channel 37 on the framework angle 15, the width of the shims 41 and the width of the channel upper leg 63 are equal to the width of the leg 69 of the framework angle 15. However, to locate the burner 3 and plate 7 in proper spacial relation to the framework angle 15, the channel lower leg is shorter than the upper leg. The width of the lower leg 59 and the length of the slot 60 therein are chosen such that the entire thermal expansion of the burner in the direction of the burner axis 34 can be accommodated on one mounting 33.

The outstanding advantage of the burner mounting 33 is that the channels 37 need not be disturbed when the burner 3 is removed for servicing or replaced after servicing. After initial installation and adjustment, the channels remain permanently in place. To remove the burner from the channels, it is merely necessary to disconnect the gas and electrical lines, as is well known, and lift the burner until the cones 57 of the two pins 49 clear the associated channel lower legs 59. Then the burner can be pulled horizontally until the angles 39 are free of the channels. In that manner, the burner is removed from the framework 5 without requiring the use of any tools or the manipulation of any fasteners associated with the burner mounting. After cleaning or other maintenance, the burner is simply moved horizontally until the pins 49 are over the corresponding channel slots 60. The burner is lowered until the angles 39 rest on the corresponding channel lower legs and the pin shanks 55 engage the channel slots 60. The burner is thus resuspended from the framework without any fitting or adjusting of the mounting.

The simplicity and advantages of the burner mounting 33 enable it to be retrofit into prior burner installations with ease. No machining of any parts is required for retrofitting. Prior mounting components are discarded, and the shims 41, channels 37, and angles 39 are installed using the mounting holes already present in the framework angles 15 and burner plates 7. The burner mounting allows the burner 3 to remain in the same location relative to the framework 5 and to the can axis 23 as it was with the prior mounting.

If desired, the spacing between the framework angle leg 69 and the channel upper leg 63 may be set by means other than the shims 41. For example, as shown in FIG. 6, some burner installations may lend themselves to the use of nuts 71 on screws 73 or similar length studs. With that design, like the design of FIGS. 3 and 4 that employ shims, the channel 37 is permanently secured to the framework angle 15 for supporting and locating the burner 3 as described above.

Thus, it is apparent that there has been provided, in accordance with the invention, a burner mounting that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A burner mounting for a selected burner having a vertical end surface comprising:
   a. an angle having a vertical first leg to be fastened to the vertical end surface of the burner and a horizontal second leg;
   b. a pin depending from the angle second leg;
   c. a channel comprising a lower horizontal leg that defines an opening therethrough, a vertical middle leg, and an upper horizontal leg that terminates in a free edge;
   d. fastener means for permanently securing the channel upper leg to a selected framework; and
   e. adjustment means interposed between the channel upper leg and the framework for accurately locating the channel lower leg at a selected vertical location,
   so that the burner can be supported at an accurately controlled location relative to the framework by resting the angle second leg on the channel lower leg and engaging the pin in the channel lower leg opening.

2. The burner mounting of claim 1 wherein the channel lower leg opening is a slot that extends in a direction perpendicular to the plane of the channel middle leg,
   so that the angle and pin are free to slide relative to the channel in directions perpendicular to the channel middle leg to accommodate burner thermal expansion.

3. The burner mounting of claim 1 wherein the adjustment means comprises at least one shim interposed between the channel upper leg and the framework to adjust the location of the channel lower leg relative to the framework.

4. The burner mounting of claim 3 wherein:
   a. the shim and the channel upper leg have a first predetermined width selected to give full bearing of the shim and channel upper leg on the framework; and
   b. the channel lower leg has a second width less than the first width to thereby enable the burner vertical end surface to be placed between the channel vertical leg and the channel top leg free edge.

5. Apparatus for removably mounting an end of a selected burner having a longitudinal axis to a horizontal member having a selected width comprising:
   a. a channel having a horizontal upper leg, a vertical middle leg, and a horizontal lower leg located at a fixed distance from the horizontal upper leg;
   b. adjustment means for adjusting the vertical location of the channel lower leg relative to the horizontal member;
   c. means for permanently fastening the channel upper leg to the horizontal member; and
   d. leg means permanently fastened to the burner for resting on the channel lower leg and for cooperating therewith to guide the burner in horizontal directions parallel to the burner longitudinal axis,
   so that the burner is mounted to the horizontal member by resting the leg means on the channel lower leg.

6. The apparatus of claim 5 wherein the adjustment means comprises shim means interposed between the channel upper leg and the horizontal member.

7. The apparatus of claim 6 wherein:
   a. the channel upper leg and the shim means have respective widths substantially equal to the width of the horizontal member to thereby provide full bearing for the channel upper leg on the horizontal member; and
   b. the channel lower leg has a free edge that is spaced from the burner and from the leg means an amount sufficient to accommodate thermal expansion of the burner relative to the channel lower leg.

8. Apparatus for removably mounting an end of a selected burner having a longitudinal axis to a horizontal member having a selected width comprising:
   a. a channel having a horizontal upper leg, a vertical middle leg, and a horizontal lower leg, wherein the channel lower leg has an opening therethrough;
   b. adjustment means for adjusting the vertical location of the channel lower leg relative to the horizontal members;
   c. means for permanently fastening the channel upper leg to the horizontal member; and
   d. leg means adopted permanently fastened to the burner for resting on the channel lower leg and for cooperating therewith to guide the burner in horizontal directions parallel to the burner longitudinal axis, wherein the leg means comprises:
      i. a horizontal leg extending from the burner end; and
      ii. pin means joined to the horizontal leg for cooperating with the opening in the channel lower leg to guide the burner in the horizontal directions parallel to the burner longitudinal axis.

9. The apparatus of claim 8 wherein the opening in the channel lower leg is a slot extending in the direction of the burner longitudinal axis to thereby allow thermal expansion of the burner relative to the channel.

10. A method of removably suspending a selected burner having opposed ends and a longitudinal axis at a selected location from a framework comprising the steps of:

a. fastening an angle having a horizontal leg with a pin therein to each end of the burner;
b. providing a pair of channels having respective horizontal supper legs and horizontal lower legs, the channel lower legs defining respective openings therethrough;
c. adjusting the channel lower legs to predetermined vertical locations relative to the framework;
d. permanently securing the channel upper legs to the framework above the respective angles; and
e. resting the horizontal legs of the angles on respective lower legs of the channel and simultaneously engaging the pins in the angle horizontal legs with the openings in the respective channel lower legs.

11. The method of claim 10 wherein the step of adjusting the channel lower legs to predetermined vertical locations relative to the framework comprises the step of interposing a selected number of shims between the framework and the channel upper legs.

12. The method of claim 10 wherein the step of providing channels with openings in the lower legs thereof comprises the step of providing channels with slots in the lower legs that extend parallel to the burner longitudinal axis,
so that the channel slots can accommodate burner thermal expansion.

13. The method of claim 10 comprising the further steps of:
a. lifting the burner and angles until the pins in the angles clear the lower legs of the respective channels; and
b. moving the burner and angles horizontally until the angles are free of the respective channels,
so that the burner can be removed from the framework without the use of tools or the manipulation of fasteners associated with suspending the burner from the framework.

14. The method of claim 13 comprising the further step of replacing the horizontal legs of the angles on the lower legs of the respective channels and simultaneously engaging the pins in the angles with the respective openings in the lower legs of the channels to thereby resuspend the burner from the framework at the selected location without the use of tools or the manipulation of fasteners associated with suspending the burner from the framework.

* * * * *